(12) United States Patent
Bobelis

(10) Patent No.: US 10,923,300 B2
(45) Date of Patent: Feb. 16, 2021

(54) DISCONNECT SWITCH WITH A DETENT MECHANISM TO PROTECT AGAINST OVER-ROTATION

(71) Applicant: LEVITON MANUFACTURING CO., INC., Melville, NY (US)

(72) Inventor: Darius Bobelis, Hauppauge, NY (US)

(73) Assignee: Leviton Manufacturing Co., Inc., Melville, NY (US)

( * ) Notice: Subject to any disclaimer, the term of this patent is extended or adjusted under 35 U.S.C. 154(b) by 0 days.

(21) Appl. No.: 16/552,124

(22) Filed: Aug. 27, 2019

(65) Prior Publication Data

US 2020/0083005 A1 Mar. 12, 2020

Related U.S. Application Data

(60) Provisional application No. 62/728,143, filed on Sep. 7, 2018.

(51) Int. Cl.
*H01H 21/22* (2006.01)

(52) U.S. Cl.
CPC ....... *H01H 21/22* (2013.01); *H01H 2221/064* (2013.01)

(58) Field of Classification Search
CPC ........ H01H 21/22; H01H 21/28; H01H 21/34; H01H 2021/225
See application file for complete search history.

(56) References Cited

U.S. PATENT DOCUMENTS

| 3,739,109 | A | * | 6/1973 | Ege | H01H 3/001 200/4 |
| 5,120,913 | A | * | 6/1992 | Leach | H02B 11/127 200/50.26 |
| 5,245,143 | A | * | 9/1993 | James | H01H 27/06 200/336 |
| 5,969,588 | A | * | 10/1999 | Nelson | H02K 7/07 310/156.01 |
| 6,974,922 | B2 | * | 12/2005 | Bortolloni | H01H 9/22 200/50.05 |
| 7,817,001 | B2 | * | 10/2010 | Kramlich | G05G 5/04 335/280 |
| 9,828,789 | B2 | | 11/2017 | Bulancea | |
| 2003/0141175 | A1 | * | 7/2003 | Spiegel | H01H 19/03 200/336 |
| 2012/0042745 | A1 | * | 2/2012 | Hamm | H01H 25/06 74/553 |

* cited by examiner

*Primary Examiner* — Kyung S Lee
(74) *Attorney, Agent, or Firm* — Kacvinsky Daisak Bluni, PLLC

(57) ABSTRACT

An electrical disconnect switch including an over-rotation protective feature to protect the load switch from damage is disclosed. The electrical disconnect switch may include an enclosure, a load switch, and a handle assembly coupled to the load switch. The disconnect switch may include a detent between the handle assembly and the load switch so that during excessive rotation or torqueing the handle assembly is permitted to decouple or break-away from the load switch to prevent excessive stress from being transferred to the load switch and thus prevent any damage to the load switch.

20 Claims, 8 Drawing Sheets

DISCONNECT SWITCH WITH A DETENT MECHANISM TO PROTECT AGAINST OVER-ROTATION

CROSS-REFERENCE TO RELATED APPLICATIONS

This application claims priority to, and the benefit of the filing date of, U.S. Provisional Patent Application Ser. No. 62/728,143, filed Sep. 7, 2018, entitled "Disconnect Switch with a Detent Mechanism to Protect Against Over-Rotation," the entire contents of which application is hereby incorporated in its entirety.

FIELD OF THE DISCLOSURE

The present disclosure relates generally to electrical disconnect switches, and more particularly to an electrical disconnect switch incorporating a detent mechanism to protect the disconnect switch and/or the load switch from damage caused by, for example, over-rotation of the handle assembly.

BACKGROUND OF THE DISCLOSURE

Electrical switches such as, for example, disconnect switches, mechanical interlocks, rotatably actuatable switches, etc. (collectively referred to herein as an electrical disconnect switch) are used in a variety of commercial applications, both indoors and outdoors, for energizing and de-energizing electrical devices, such as machinery, motors, lights, fans, pumps, generators and the like.

Generally speaking, referring to FIGS. 1 and 2, an electrical disconnect switch 10 may include an external handle assembly 50 connected to an electrical load switch 75 located within an electrical enclosure 20. In use, the enclosure 20 may include a body portion 22 and a door 24. The door 24 may be pivotably coupled to the body portion 22 by hinges 26 for opening and closing the door 24 to provide access to an interior portion of the enclosure 20. The door 24 may be pivotably coupled to the body portion 22 of the enclosure 20 along any wall thereof, for example, to a side wall of the body portion 22 as illustrated in FIG. 2, or along a bottom wall of the body portion 22 as illustrated in FIG. 1. Additionally, the enclosure 20 may include one or more fasteners 30 for securing the door 24 to the body portion 22.

Referring to FIG. 2, the electrical disconnect switch 10 includes an electrical load switch 75 mounted in an interior of the enclosure 20. The electrical disconnect switch 10 may also include a number of other electrical components as well such as, for example, fuses, relays, contactors, etc. As will be appreciated by one of ordinary skill in the art, the electrical disconnect switch 10 receives power through a plurality of power input lines 27 and supplies power to an associated electrical device via a plurality of output lines 28. The handle assembly 50 (FIG. 1) on the front of the door 24 is coupled (interlocked) to the load switch 75 through, for example, a shaft 90 (FIG. 3) to operate the actuating mechanism of the load switch 75. That is, referring to FIG. 3, the load switch 75 may be equipped with a switch shaft 76 having a lateral pin 78 disposed at a distal end 80 thereof. The distal end 80 of the switch shaft 76 may be received within a recess 92 formed in the shaft 90 to rotationally lock the shaft 90 to the switch shaft 76. Thus arranged, rotational movement of the handle assembly 50 causes the shaft 90 to rotate, which in turn rotates the switch shaft 76 via the pin/slot interaction.

In use, as will be appreciated by one of ordinary skill in the art, a load associated with the load switch 75 can be energized or de-energized, depending on the direction of rotation of the handle assembly 50. That is, the electrical disconnect switch 10 is "ON" (e.g., supplying power to the associated electrical device) when the door 24 of the enclosure 20 is closed and the handle assembly 50 is in an "ON" position. When the handle assembly 50 is moved to an "OFF" position, the actuating mechanism of the load switch 75 will have been moved to open the contacts, so that power to the associated electrical device is disconnected. Generally speaking, the handle assembly 50 is rotated ninety-degrees to transition the electrical disconnect switch between the ON and OFF positions. This is a simplified explanation of the operation of the electrical disconnect switch 10 for purposes of the present disclosure. The electrical disconnect switches illustrated and described herein are provided for background information. The present disclosure has wide applicability and should not be limited to any particular electrical disconnect switch unless specifically claimed.

As will be appreciated, electrical disconnect switches 10 find wide industrial application, and thus they may be employed in a variety of harsh environments such as, for example, rain (for outdoor applications), water spray (for indoor applications in which a hygienic work space is required), dust, etc. Additionally, electrical disconnect switches 10 may be operated in tough working conditions and thus may be subject to high stresses. For example, during an emergency, the electrical disconnect switch 10 may be operated to disconnect electrical power to the associated electrical device. As a result, electrical disconnect switches 10 may be subject to damage by, for example, over-rotation of the handle assembly 50. Accordingly, it would be desirable to provide an electrical disconnect switch with an improved mechanism to protect against damage caused by over-rotation.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Disclosed herein is an electrical disconnect switch. In various embodiments, the electrical disconnect switch includes an enclosure having a front surface and an interior portion. The enclosure may include a load switch disposed within the interior portion, the load switch being rotatable between an ON position and an OFF position, and a handle assembly including a rotatable handle and a shaft, the shaft being arranged and configured to selectively couple the rotatable handle to the load switch, the rotatable handle being accessible via the front surface. The shaft includes a detent, the detent being arranged and configured to enable the rotatable handle to be selectively decoupled from the load switch upon application of a predetermined amount of force.

In one embodiment, the load switch is operatively coupled to a switch shaft, the switch shaft including a cap at a distal end of the switch shaft. The cap and the shaft being coupled to each other via the detent such that application of the predetermined amount of force causes the shaft to decouple from the cap.

In one embodiment, the detent includes a spring plunger. The spring plunger being positioned in one of the shaft and the cap, the other one of the shaft and the cap includes a recess for receiving an end portion of the spring plunger. The spring plunger may include a body portion, a plunger element, and a spring for biasing the plunger element away from the body portion and into contact with the recess. In use, application of the predetermined amount of force causes the plunger element to decouple from the recess so that the handle assembly can freely rotate until the plunger element re-engages the recess.

In one embodiment, the detent may be an axial detent extending from a front surface of one of the shaft and the cap. The other one of the shaft and the cap includes a recess for receiving at least a portion of the axial detent. The shaft may include a spring for biasing the shaft towards the cap. In use, application of the predetermined amount of force over-rides the biasing force supplied by the spring causing the shaft and the cap to decouple from each other.

In one embodiment, the detent includes a spring. The shaft may include a recess formed in a front face thereof for receiving a portion of the cap therein. The shaft may further include a groove formed in an inner surface of the recess for receiving the spring. The cap may include a recess for receiving a portion of the spring. The spring may include a first end, a second end, and an intermediate portion positioned between the first and second ends, the intermediate portion include a bulge for operatively engaging the recess formed in the cap. In use, application of the predetermined amount of force causes the bulge formed in the intermediate portion of the spring to deflect to decouple the spring from the recess.

BRIEF DESCRIPTION OF THE DRAWINGS

By way of example, a specific embodiment of the disclosed device will now be described, with reference to the accompanying drawings, in which.

Figure 1:
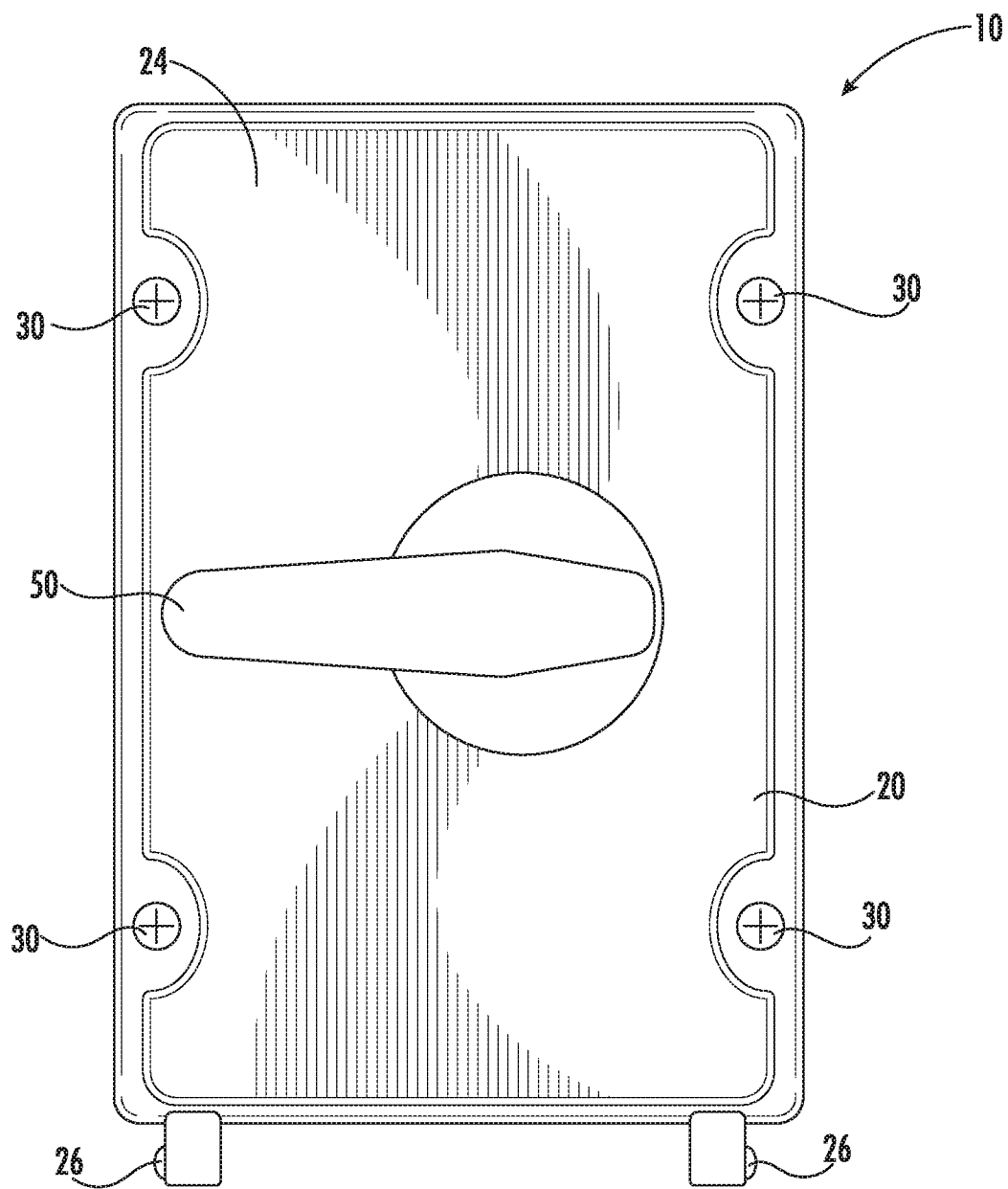
FIG. 1 is a front view of a known electrical disconnect switch.
Figure 2:
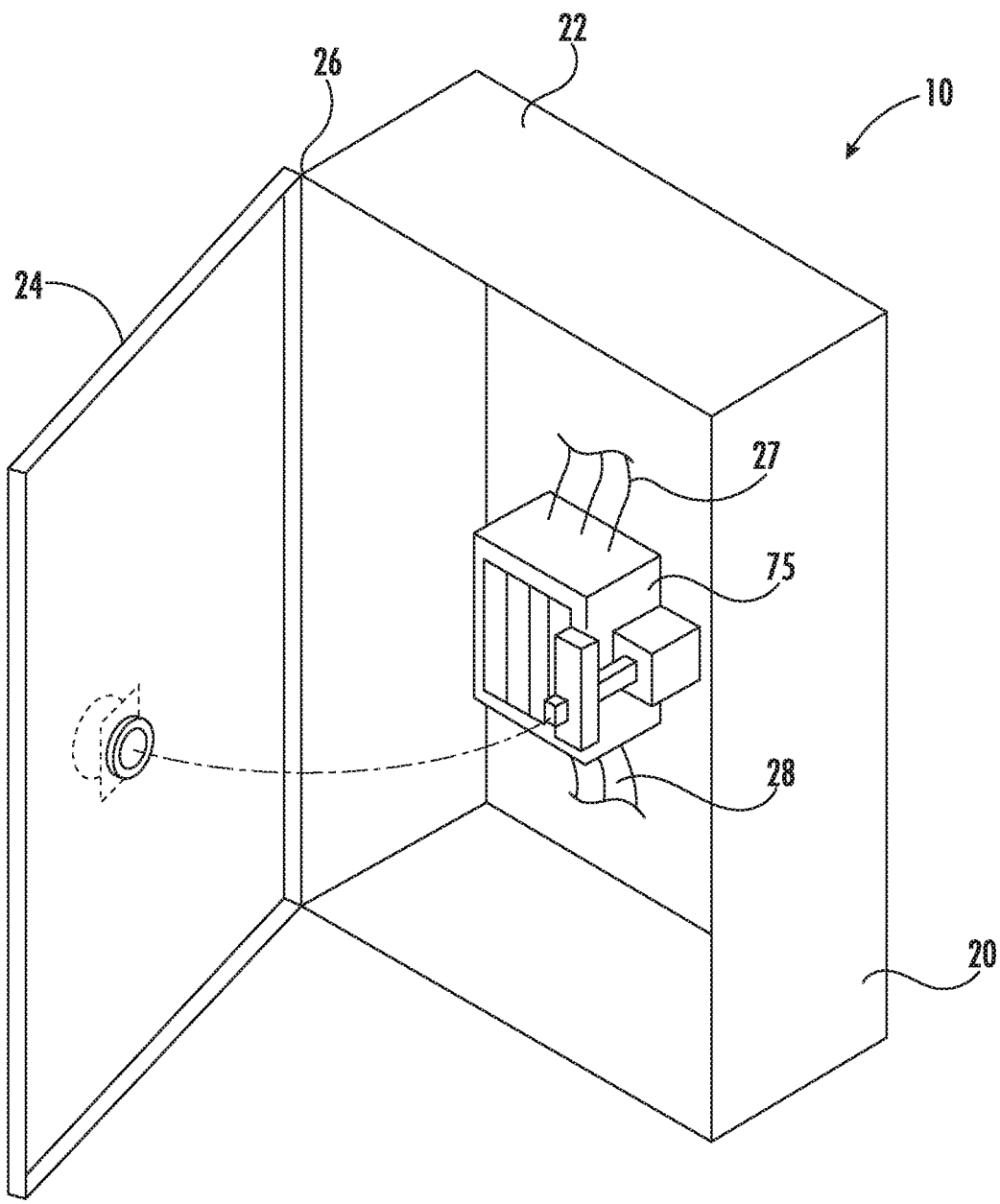
FIG. 2 is a front, perspective view of an alternate, known electrical disconnect switch, the front door of the electrical disconnect switch illustrated in an opened position.

The drawings are not necessarily to scale. The drawings are merely representations, not intended to portray specific parameters of the disclosure. The drawings are intended to depict example embodiments of the disclosure, and therefore are not be considered as limiting in scope. In the drawings, like numbering represents like elements.

DETAILED DESCRIPTION

Numerous embodiments of an over-rotation protective feature for use with an electrical disconnect switch in accordance with the present disclosure will now be described more fully hereinafter with reference to the accompanying drawings, in which preferred embodiments of the present disclosure are presented. As will be described and illustrated, in some embodiments, the electrical disconnect switch may include a detent or a detent mechanism (used interchangeably herein without the intent to limit) located between the handle assembly located externally of the enclosure and the load switch located within the enclosure so that during excessive rotation or torqueing the handle assembly is permitted to decouple or break-away from the load switch to prevent excessive stress from being transferred to the load switch and thus prevent any damage to the load switch. In one embodiment, excessive stress or application of a predetermined amount of force may substantially correspond to an amount of stress associated with damage to the load switch. The over-rotation feature of the present disclosure may, however, be embodied in many different forms and should not be construed as being limited to the embodiments set forth herein. Rather, these embodiments are provided so that this disclosure will convey certain example aspects of the over-rotation feature to those skilled in the art. In the drawings, like numbers refer to like elements throughout unless otherwise noted.

As will be described in greater detail below, in various embodiments, an electrical disconnect switch according to the present disclosure may include one or more over-rotation features to prevent damage to the electrical disconnect switch due to over-rotation of the handle assembly. That is, for example, according to the present disclosure, an electrical disconnect switch may incorporate an over-rotation feature to protect the load switch 75 located within the enclosure 20 of the electrical disconnect switch 10 from over-rotation, for example, rotation beyond the ON/OFF positions, which may damage the load switch 75. That is, in some embodiments, the over-rotation feature of the present disclosure provides one or more mechanisms to prevent excessive stress or application of force exceeding a predetermined amount of force (e.g., to prevent stress levels or forces associated with damage to the load switch) caused by over-rotation of the handle assembly 50 from being transferred to the load switch 75.

As will be described herein, the over-rotation feature according to the present disclosure may be used with any suitable electrical disconnect switch now known or hereafter developed. As such, details regarding construction, operation, etc. of the electrical disconnect switch are omitted for sake of brevity of the present disclosure. In this regard, it should be understood that the present disclosure should not be limited to the details of the electrical disconnect switch disclosed and illustrated herein unless specifically claimed and that any suitable electrical disconnect switch can be used in connection with the principles of the present disclosure.

The over-rotation feature according to the present disclosure may be any suitable over-rotation feature now known or hereafter developed including, for example, a detent mechanism, a slip-clutch assembly, or the like. Additionally, the over-rotation feature may be positioned anywhere in the electrical disconnect switch 10 between the handle assembly 50 and the load switch 75. In this manner, the over-rotation feature enables the handle assembly 50 to connect to the load switch 75 while also enabling the handle assembly 50 to decouple, disconnect, break-away, or the like from the load switch 75 if the handle assembly 50 is over-rotated or subject to excessive torque, which may damage the load switch 75. That is, once the load switch 75 is actuated as required, continued rotation or excessive torqueing of the handle assembly 50 will cause the handle assembly 50 to decouple from the load switch 75 to prevent damage to the load switch 75. In some embodiments, the over-rotation feature is re-settable such that, once it has broken away, the over-rotation feature can be automatically reset by continued rotation and re-engagement of the over-rotation feature (e.g., detent mechanism).

Figure 3:
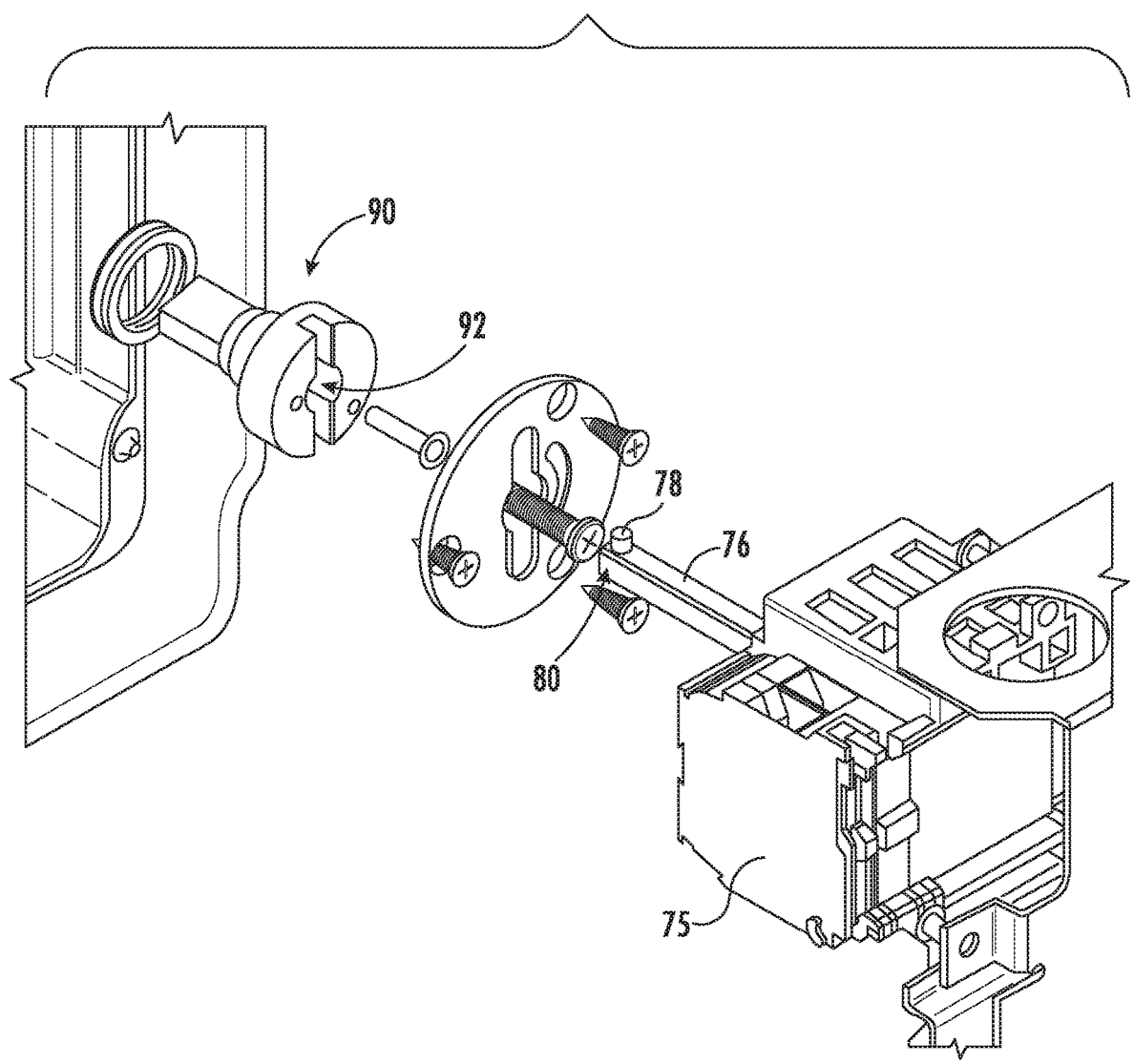
FIG. 3 is an exploded, perspective view of a known assembly for coupling an externally mounted handle assembly to an internally positioned load switch in an electrical disconnect switch.
Figure 4A:
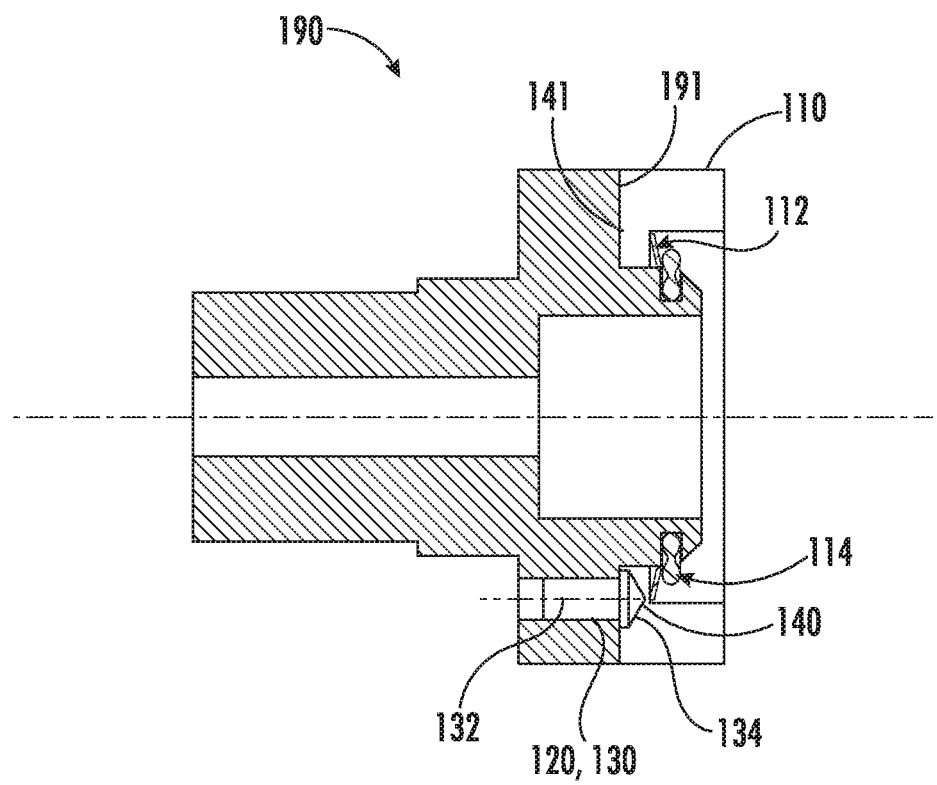
FIG. 4A is a side, cross-sectional view of an example embodiment of a detent mechanism for coupling an externally mounted handle assembly to an internally positioned load switch in an electrical disconnect switch in accordance with one aspect of the present disclosure.
Figure 4B:
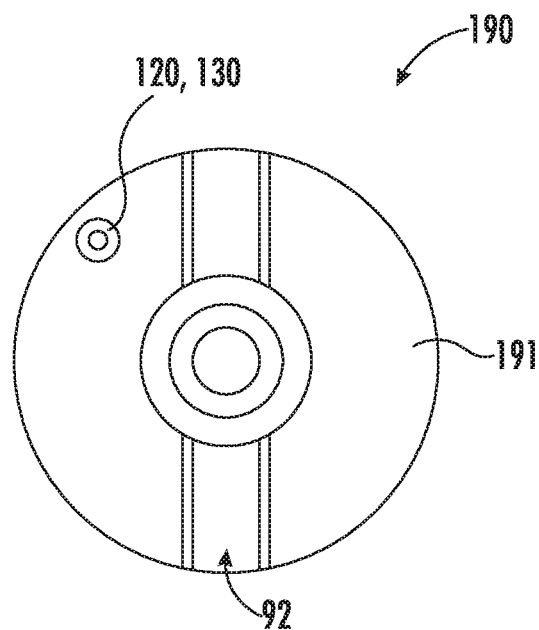
FIG. 4B is a front view of an example embodiment of a switch incorporating a detent mechanism as shown in FIG. 4A.

Referring to FIGS. 4A and 4B, in one illustrative, example embodiment, the over-rotation feature may be in the form of a multi-piece shaft incorporating a detent mechanism. That is, as illustrated in the example embodiment, the switch shaft 76 (FIG. 3) may be operatively coupled to a cap 110, for example, the distal end 80 of the switch shaft 76 may be operatively coupled to the cap 110. A spring 112 may be provided for biasing the cap 110 towards the shaft 190. The spring 112 may be a wave spring, a conical flat spring, a disk spring, a Belleville washer, although other types of springs and/or biasing members are envisioned. In use, the spring 112 may be constrained or restrained by, for example, a snap ring 114 or the like. Additionally, the shaft 190 may incorporate a detent mechanism 120 for interacting with the cap 110, which is operatively coupled to the load switch 75 via the switch shaft 76. In use, over-rotation or excessive torque transmitted from the handle assembly 50 causes the shaft 190 to decouple from the cap 110 so that any excessive rotation or torque applied to the handle assembly 50 is prevented from transferring to the load switch 75.

Figure 4C:
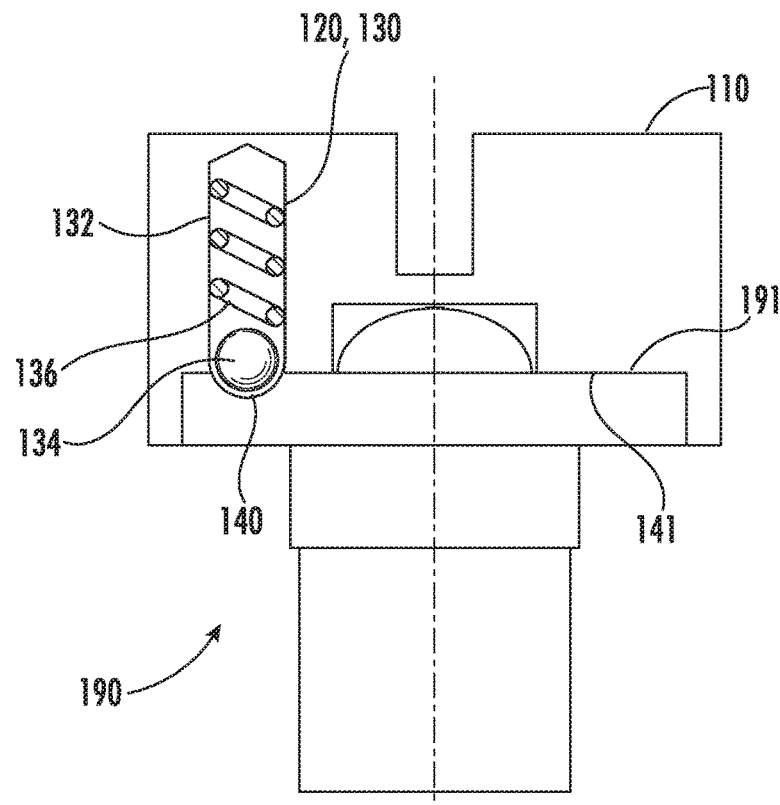
FIG. 4C is a side, cross-sectional view of an alternate example embodiment of a detent mechanism for coupling an externally mounted handle assembly to an internally positioned load switch in an electrical disconnect switch in accordance with one aspect of the present disclosure.

As illustratively shown in FIGS. 4A-4D, in one example embodiment, the detent mechanism 120 may be in the form of a spring biased plunger 130. The spring biased plunger 130 may include a body portion 132, a plunger element 134 and a spring 136 for biasing the plunger element 134 away from the body portion 132. For example, as illustrated in FIGS. 4A and 4B, the spring biased plunger 130 may be positioned within a cavity formed in the shaft 190, the plunger element 134 being biased by the spring 136 away from the body portion 132 and towards the cap 110. Alternatively, as illustrated in FIG. 4C, the spring biased plunger 130 may be positioned within a cavity formed in the cap 110, the plunger element 134 being biased by the spring 136 toward a front surface 191 of the shaft 190. As will be appreciated by one of ordinary skill in the art, the spring plunger 130 may be any commercially available, off-the-shelf spring plunger.

Referring to FIGS. 4A and 4B, in one illustrated embodiment, in use, the body portion 132 of the spring plunger 130 may be positioned within a cavity formed in the shaft 190 such that the plunger element 134 extends axially from a front surface 191 of the shaft 190. Additionally, the cap 110 may include a recess or partial borehole 140 for interacting with (e.g., partially receiving) the plunger element 134. In use, with the plunger element 134 residing in the recess 140 formed in the cap 110, rotation of the handle assembly 50 is transmitted to the load switch 75. However, if excessive rotation or torque is applied to the handle assembly 50, the plunger element 134 will decouple from the recess 140 thus preventing rotation from the shaft 190, which is associated with the handle assembly 50, from being transmitted to the cap 110, which is associated with the load switch 75. That is, in one embodiment, over-rotation (e.g., motion exceeding 90 degrees) or excessive torque applied to the handle assembly 50 will cause the shaft 190 to release or slip relative to the cap 110. For example, with the handle assembly 50 in the ON position, a user may rotate the handle assembly 50 by, for example, ninety degrees to the OFF position to terminate electrical power being transferred to the associated electrical device. In use, however, the user may over-rotate or apply excessive torque to the handle assembly 50 beyond that required to move the handle assembly 50 from the ON position to the OFF position. In such situation, the detent mechanism 120 (e.g., spring plunger 130) may decouple the handle assembly 50 from the load switch 75, and more specifically, may decouple the shaft 190 from the cap 110, to protect the load switch 75.

Thereafter, the handle assembly 50 can rotate (e.g., freely spin), for example, 360 degrees if rotated in the same direction or less if rotated in the opposite direction, by slipping until the plunger element 134 finds the recess 140 again. In this manner, with the detent (e.g., plunger element 134) positioned within the recess 140, the handle assembly 50 will be re-settable and will always be properly positioned relative to the load switch 75. In this manner, the detent mechanism 120 is automatically resettable simply by continuing to rotate the handle assembly 50.

Figure 4D:
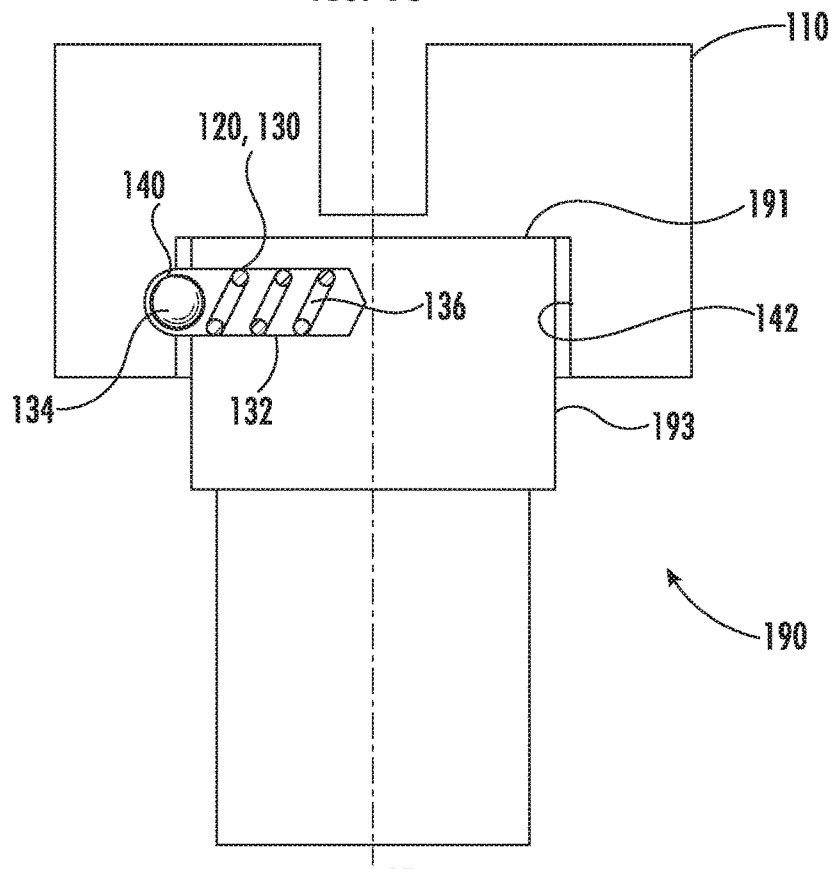
FIG. 4D is a side, cross-sectional view of an alternate example embodiment of a detent mechanism for coupling an externally mounted handle assembly to an internally positioned load switch in an electrical disconnect switch in accordance with one aspect of the present disclosure.

Referring to FIGS. 4A-4D, the detent mechanism 120 (e.g., spring plunger 130) may be positioned in any of a variety of locations and/or orientations relative to the shaft 190 and cap 110. For example, as illustrated in FIGS. 4A and 4B, and as previously described, the body portion 132 of the spring plunger 130 may be positioned within a cavity formed in the shaft 190 such that the plunger element 134 extends axially from a front surface 191 of the shaft 190 and the recess 140 may be formed in a front surface 141 of the cap 110. Alternatively, as illustrated in FIG. 4C, the body portion 132 of the spring plunger 130 may be positioned within a cavity formed in the cap 110 such that the plunger element 134 extends axially from the front surface 141 of the cap 110 and the recess 140 may be formed in the front surface 191 of the shaft 190. Alternatively, as illustrated in FIG. 4D, the spring plunger 130 may be positioned so that the plunger element 134 extends from a side surface 193 of the shaft 190 and the recess 140 may be formed in a side surface 142 of the cap 110, or vice-versa.

Figure 5A:
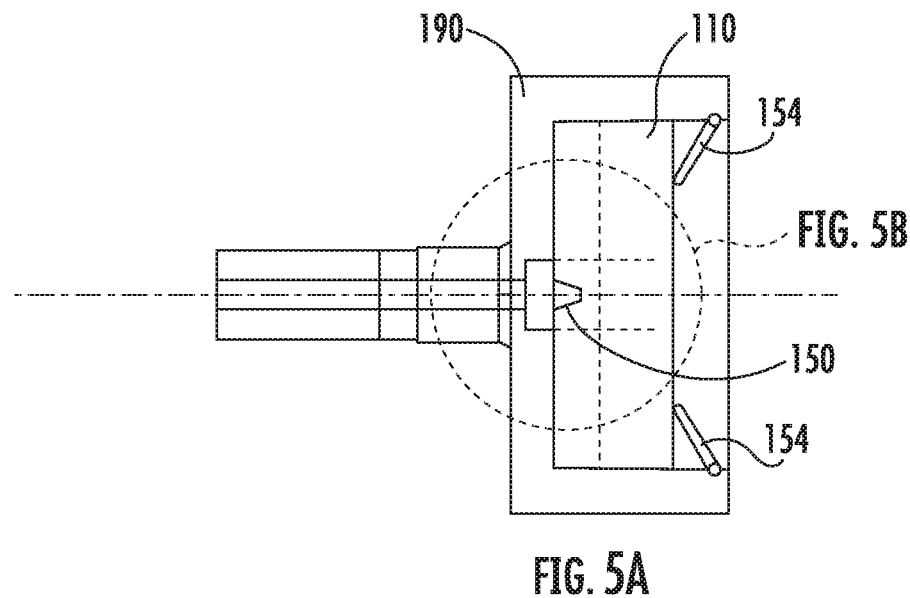
FIG. 5A is a side, cross-sectional view of an alternate example embodiment of a detent mechanism for coupling an externally mounted handle assembly to an internally positioned load switch in an electrical disconnect switch in accordance with one aspect of the present disclosure.

Moreover, while the detent mechanism 120 has been described as being in the form of a spring plunger 130, the detent mechanism 120 can be any suitable mechanism now known or hereafter developed. For example, referring to FIGS. 5A and 5B, the detent mechanism 120 may be in the form of an axial detent or pawl. That is, as illustrated, the shaft 190 may include an axial detent or pawl 150 for contacting a surface formed in a recess 152 of the cap 110. In addition, the shaft 190 may include a spring 154 such as, for example, a wave spring, a conical flat spring, a disk spring, a Belleville washer, or the like, for biasing the cap 110 towards the shaft 190. In use, rotation of the handle assembly 50 is transmitted from the shaft 190 to the cap 110 to the switch shaft 76 and to the load switch 75. However, during an over-rotation or excessive torqueing situation, the excessive load caused by over-rotation or torqueing will over-ride the biasing force supplied by the spring 154 causing the shaft 190 to pull away from the cap 110 until the excessive force is removed. In this manner, during excessive rotation or torque, the associated excessive stress causes the shaft 190 to decouple from the cap 110.

Figure 5B:
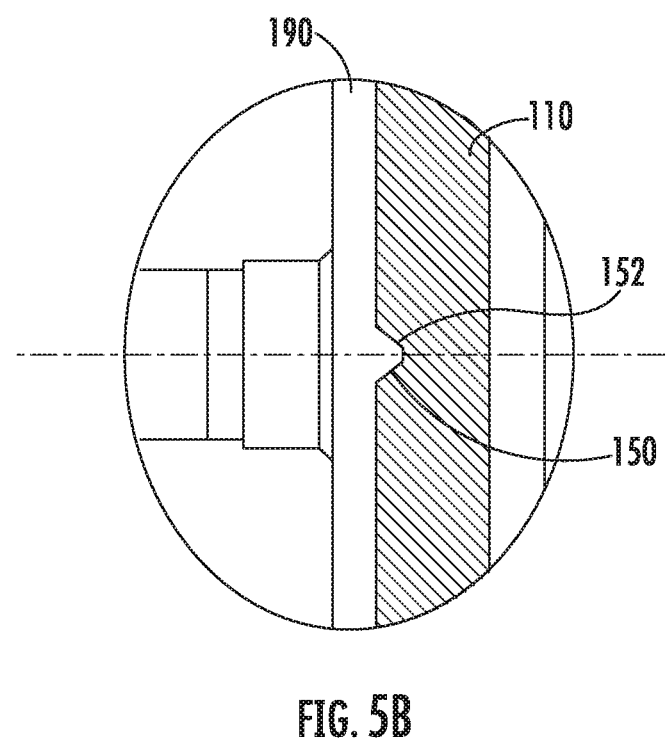
FIG. 5B is a detailed view of the detent mechanism shown in FIG. 5A.

Referring to FIG. 5B, in use, the axial detent or pawl 150 may have a trapezoidal shape for receipt within a corresponding trapezoidal recess, although other shapes are envisioned.

Figure 6A:
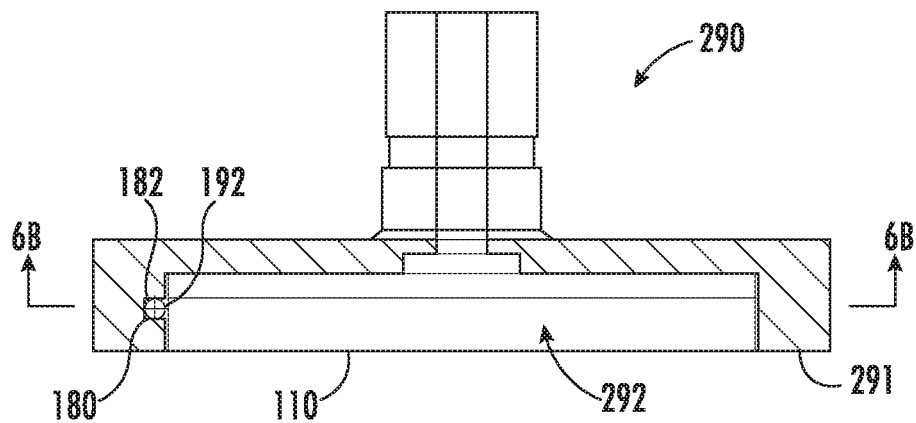
FIG. 6A is a side, cross-sectional view of an alternate example embodiment of a detent mechanism for coupling an externally mounted handle assembly to an internally positioned load switch in an electrical disconnect switch in accordance with one aspect of the present disclosure.
Figure 6B:
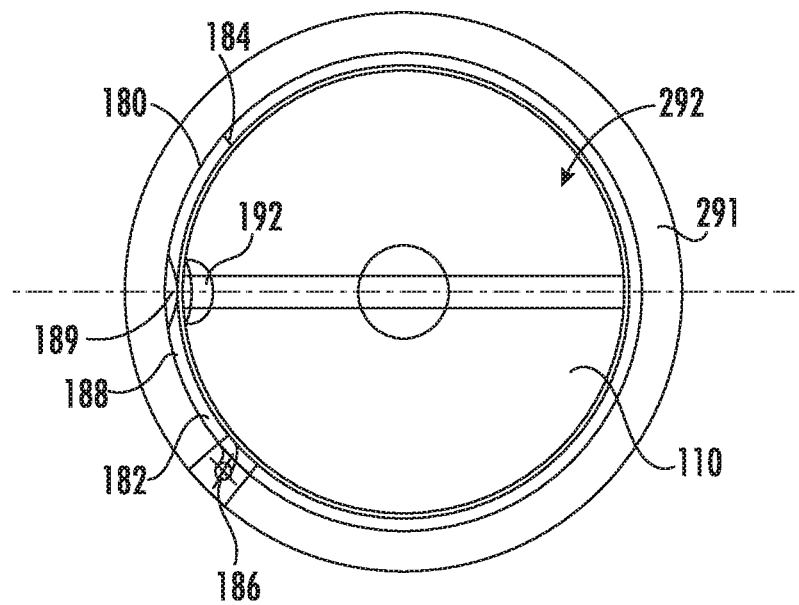
FIG. 6B is a cross-sectional view of the detent mechanism shown in FIG. 6A taken along line 6B-6B in FIG. 6A.

Alternatively, referring to FIGS. 6A and 6B, the detent mechanism 120 may be in the form of a spring element 180. That is, in accordance with the present embodiment, the shaft 290 may include a recess 292 formed in a front surface 291 thereof for receiving the cap 110, which is operatively coupled with the switch shaft 76. As such, in connection with the embodiment of FIGS. 6A and 6B, the cap 110 is adapted and configured for positioning within the shaft 290. In addition, the shaft 290 may include a partial groove 182 formed in an inner surface of the recess 292 for receiving the spring 180. In use, the cap 110 may include a groove or recess 192 for receiving a portion of the spring 180 so that, during normal operation of the device, rotation of the handle assembly 50 is transmitted from the shaft 290 to the cap 110 via the interaction between the spring 180 located in the switch 290 and the groove 192 formed in the cap 110. Alternatively, it is envisioned that the spring 180 may be positioned in the cap 110 and the groove 192 may be formed in the switch 290.

Figure 6C:
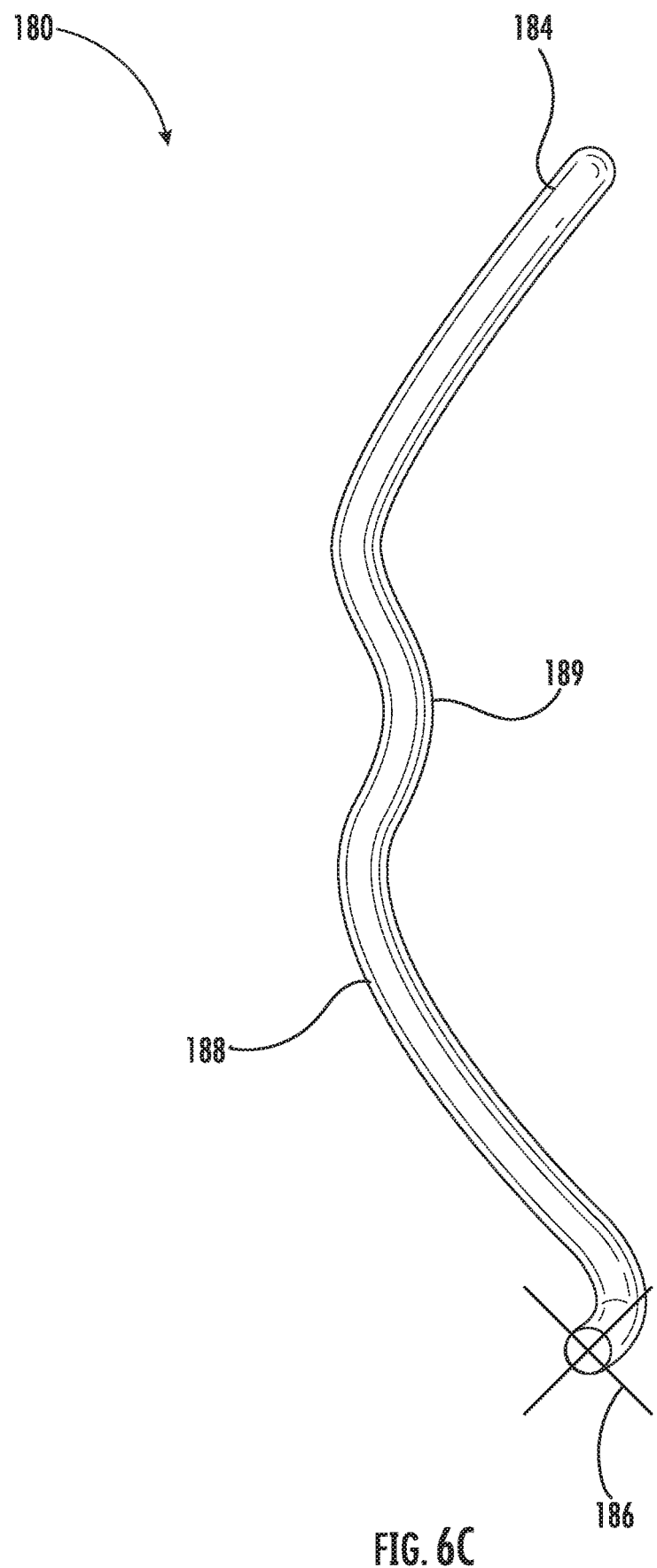
FIG. 6C is a top view of an example embodiment of a spring element used in connection with the detent mechanism shown in FIG. 6A.

Referring to FIG. 6C, the spring 180 may include a first end 184, a second end 186, and intermediate portion 188 positioned therebetween. The intermediate portion 188 may include a bend or bulge 189 for operatively engaging the corresponding groove 192 formed in the cap 110.

In use, with the bulge 189 of the spring 180 residing in the groove 192 formed in the cap 110, rotation of the handle assembly 50 is transmitted to the load switch 75. However, if excessive rotation or torque is applied to the handle assembly 50, the spring 180, and more specifically, the bulge 189 formed in the intermediate portion 188 of the spring 180, will deflect inwards causing the spring 180 to flatten out, deflect, move into, or the like, the partial groove 182 formed in the inner surface of the recess 292 of the shaft 290 causing the bulge 189 to decouple from the groove 192 thus preventing rotation from the handle assembly 50 to the load switch 75. Thereafter, the handle assembly 50 can rotate (e.g., freely spin), for example, 360 degrees if rotated in the same direction or less if rotated in the opposite direction, by slipping until the bulge 189 formed in the intermediate portion 188 of the spring 180 finds the groove 192 again. In this manner, with the detent (e.g., bulge 189 formed in the intermediate portion 188 of the spring 180) positioned within the groove 192, the handle assembly 50 will always be properly positioned relative to the load switch 75. That is, the detent (e.g., bulge 189 formed in the intermediate portion 188 of the spring 180) is automatically re-settable such that, once it has broken away, the detent can reset itself by continued rotation and re-engagement of the detent with the groove 192.

In use, as previously mentioned, regardless of the configuration of the detent being used, the detent preferably is adapted and configured to engage a single corresponding groove or recess so that in use, once the detent is properly positioned within the groove or recess, the handle assembly 50 is always properly positioned relative to the load switch 75, although it is envisioned that in certain situations, it may be beneficial to include more than one corresponding groove or recess. That is, by providing a single recess or location for receiving the detent, the handle assembly 50 always finds its proper location upon continued or return rotation.

Additionally, in some embodiments, the detent is configured so that a calculated force achieves a predetermined break-out torque. In this manner, the user can easily rotate the handle assembly 50 under normal operating conditions without worrying about the handle assembly 50 decoupling from the load switch 75. It is only when excessive forces are applied due to over-rotation or over-torqueing that the handle assembly 50 is decoupled from the load switch 75. Thus, in some embodiments the detent mechanism is configured to transmit rotational loads associated with typical actuation forces of an electrical switch. The detent mechanism may also be configured to decouple associated sections of the switching mechanism when subjected to rotational forces that are a predetermined amount below a failure load of the load switch.

The disconnect switch may be provided in any required size and/or rating. For example, the disconnect switch may be provided with ratings of 60 amps, 30 amps and smaller. Alternatively, the disconnect switch may be provided in larger amps.

While the present disclosure refers to certain embodiments, numerous modifications, alterations, and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof. The discussion of any embodiment is meant only to be explanatory and is not intended to suggest that the scope of the disclosure, including the claims, is limited to these embodiments. In other words, while illustrative embodiments of the disclosure have been described in detail herein, it is to be understood that the inventive concepts may be otherwise variously embodied and employed, and that the appended claims are intended to be construed to include such variations, except as limited by the prior art.

The foregoing discussion has been presented for purposes of illustration and description and is not intended to limit the disclosure to the form or forms disclosed herein. For example, various features of the disclosure are grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

The phrases "at least one", "one or more", and "and/or", as used herein, are open-ended expressions that are both conjunctive and disjunctive in operation. The terms "a" (or "an"), "one or more" and "at least one" can be used interchangeably herein. All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., engaged, attached, coupled, connected, and joined) are to be construed broadly and may include intermediate members between a collection of elements and relative to movement between elements unless otherwise indicated. As such, connection references do not necessarily infer that two elements are directly connected and in fixed relation to each other. All rotational references describe relative movement between the various elements. Identification references (e.g., primary, secondary, first, second, third, fourth, etc.) are not intended to connote importance or priority but are used to distinguish one feature from another. The drawings are for purposes of illustration only and the dimensions, positions, order and relative to sizes reflected in the drawings attached hereto may vary.

What is claimed is:

1. An electrical disconnect switch including an over-rotational feature, the electrical disconnect switch comprising:
   an enclosure having a front surface and an interior portion, the enclosure comprising:
      a load switch disposed within the interior portion, the load switch being rotatable between an ON position and an OFF position;
      a handle assembly comprising a rotatable handle and a shaft, the shaft being arranged and configured to selectively couple the rotatable handle to the load switch, the rotatable handle being accessible via the front surface;
      wherein the shaft includes a detent, the detent being arranged and configured to enable the rotatable handle to be selectively decoupled from the load switch upon application of a predetermined amount of torque and to be recoupled to the load switch when the detent realigns.

2. The disconnect switch of claim 1, wherein the load switch is operatively coupled to a switch shaft, the switch shaft including a cap at a distal end of the switch shaft, the cap and the shaft being coupled to each other via the detent such that application of the predetermined amount of torque causes the shaft to decouple from the cap.

3. The disconnect switch of claim 2, wherein the detent includes a spring plunger, the spring plunger being positioned in one of the shaft and the cap, the other one of the shaft and the cap includes a recess for receiving an end portion of the spring plunger.

4. The disconnect switch of claim 3, wherein the spring plunger includes a body portion, a plunger element, and a spring for biasing the plunger element away from the body portion and into contact with the recess.

5. The disconnect switch of claim 4, wherein the body portion of the spring plunger is positioned within a cavity formed in one of the shaft and the cap.

6. The disconnect switch of claim 5, wherein the plunger element extends axially from a front surface of the switch or cap.

7. The disconnect switch of claim 5, wherein the plunger element extends radially from a side surface of the switch or cap.

8. The disconnect switch of claim 4, wherein application of the predetermined amount of torque causes the plunger element to decouple from the recess so that the handle assembly can freely rotate until the plunger element re-engages the recess.

9. The disconnect switch of claim 2, wherein the detent is an axial detent extending from a front surface of one of the shaft and the cap.

10. The disconnect switch of claim 9, wherein the other one of the shaft and the cap includes a recess for receiving at least a portion of the axial detent.

11. The disconnect switch of claim 9, wherein the shaft includes a spring arranged and configured to provide a biasing force for biasing the shaft towards the cap.

12. The disconnect switch of claim 11, wherein application of the predetermined amount of torque over-rides the biasing force supplied by the spring causing the shaft and the cap to decouple from each other.

13. The disconnect switch of claim 9, wherein the axial detent includes a trapezoidal shape.

14. The disconnect switch of claim 2, wherein the detent includes a spring, the shaft includes a recess formed in a front face thereof for receiving a portion of the cap therein and the shaft includes a groove formed in an inner surface of the recess for receiving the spring, the cap includes a recess for receiving a portion of the spring.

15. The disconnect switch of claim 14, wherein the spring includes a first end, a second end, and an intermediate portion positioned between the first and second ends, the intermediate portion include a bulge for operatively engaging the recess formed in the cap.

16. The disconnect switch of claim 15, wherein application of the predetermined amount of torque causes the bulge formed in the intermediate portion of the spring to deflect to decouple the spring from the recess.

17. The disconnect switch of claim 1, wherein the handle assembly is rotated by ninety-degrees to transition the disconnect switch between the ON and OFF positions.

18. An electrical disconnect switch comprising:
   an enclosure having a front surface and an interior portion, the enclosure comprising:
      a load switch disposed within the interior portion, the load switch being rotatable between an ON position and an OFF position, the load switch operatively coupled to a switch shaft;
      a handle assembly comprising a rotatable handle and a shaft, the rotatable handle operatively coupled to the shaft, the shaft being operatively coupled to the switch shaft to selectively couple the rotatable handle to the load switch, the rotatable handle being accessible via the front surface,
   wherein the switch shaft includes a cap at a distal end thereof, the cap being arranged and configured to couple to the shaft via a detent, the detent being arranged and configured to enable the rotatable handle to be selectively decoupled from the load switch upon application of a predetermined amount of torque such that application of the predetermined amount of torque causes the shaft to decouple from the cap; and wherein the detent includes a spring, the shaft includes a recess formed in a front face thereof for receiving a portion of the cap therein and the shaft includes a groove formed in an inner surface of the recess for receiving the spring, the cap includes a recess for receiving a portion of the spring.

19. The disconnect switch of claim 18, wherein the spring includes a first end, a second end, and an intermediate portion positioned between the first and second ends, the intermediate portion include a bulge for operatively engaging the recess formed in the cap.

20. The disconnect switch of claim 19, wherein application of the predetermined amount of torque causes the bulge formed in the intermediate portion of the spring to deflect to decouple the spring from the recess.

\* \* \* \* \*